United States Patent Office 2,846,417
Patented Aug. 5, 1958

2,846,417

TERPOLYMERS OF N-ACRYLAMIDOALKYL BETAINES

Comer Drake Shacklett, Roselle, N. J., assignor to E. I. du Pont de Nemours and Company, Wilmington, Del., a corporation of Delaware No Drawing. Application March 9, 1954
Serial No. 415,161

10 Claims. (Cl. 260—78)

This invention relates to organic addition polymers and to their preparation. More particularly, it relates to addition polymers of high molecular weight which contain unsubstituted or alkyl-substituted extralinear amide groups, dihydroxyalkane-substituted extralinear amide groups, and betaine-substituted extralinear amide groups. Still more particularly, it relates to such copolymers which have peptizing, dispersing, and protective colloid properties.

Gelatin has been widely used as the water-permeable colloid binding agent for the light-sensitive silver halide grains in photographic dispersions or emulsions. It has enjoyed such use because of its good dispersing properties, in addition to its excellent protective colloid properties. Gelatin has a number of disadvantages, however, being subject to attack by bacteria and molds and lacking uniformity. It has extremely variable properties which depend upon its source and the particular treatments which have been applied to it. Various natural and synthetic colloids have been proposed as substitutes for gelatin. The natural materials, in general, are inferior to gelatin. The proposed synthetic materials, while possessing reasonably useful protective colloid properties and forming freely water-permeable films, are not as satisfactory as gelatin as dispersing and protective colloid agents. By using such synthetic colloids it has not been possible to make photographic silver halide emulsions of the high sensitivity to light required for negative and X-ray emulsions.

An object of this invention is to provide a new class of organic copolymers of high molecular weight. Another object is to provide such copolymers which are useful as water-permeable colloids. Still another object is to provide such copolymers which possess the advantageous properties of gelatin but are free from its disadvantageous properties. A further object is to provide synthetic polymers which are useful as gelatin substitutes and permit the manufacture of high speed negative and X-ray type photographic silver halide emulsions. A still further object is to provide organic copolymers which can be gelled, de-gelled and re-gelled and form firm, strong, water-permeable, thin layers. Still other objects will be apparent from the following and more detailed description of the invention.

The above objects are attained by the provision of a new class of organic addition copolymers which contain three or more different types of units, one including extralinear N-substituted amide groups containing alpha or beta glycol groups, another including extralinear N-substituted amide groups containing betaine groups and the third including extralinear unsubstituted or alkyl substituted amide groups free from betaine and glycol substituents. These novel copolymers contain a plurality of intralinear units of the formulae:

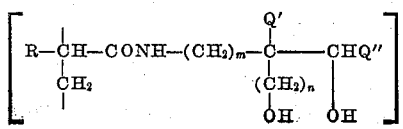

wherein R is a member taken from the group consisting of hydrogen, alkyl of 1 to 3 carbon atoms, phenyl and cyclohexyl, Q' and Q" are members taken from the group consisting of hydrogen and alkyl of 1 to 3 carbon atoms, m is 0, 1, 2, 3, or 4, and n is 0 or 1 and the sum of m and n must equal at least 1;

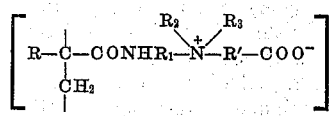

wherein R is a member taken from the group consisting of hydrogen, alkyl radicals of 1 to 3 carbon atoms, phenyl and cyclohexyl, $R_1$ is a saturated bivalent aliphatic hydrocarbon radical of 2 to 6 carbon atoms, $R_2$ is an alkyl radical of 1 to 3 carbon atoms, $R_3$ is an alkyl radical of 1 to 3 carbon atoms, and R' is a saturated bivalent aliphatic hydrocarbon radical of 1 to 4 carbon atoms; and

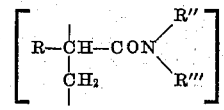

wherein R, R" and R''' are members taken from the group consisting of hydrogen, alkyl of 1 to 3 carbon atoms, phenyl and cyclohexyl. These copolymers may contain 1, 2 or more different units of each of Formulas, I, II, and III, as will be apparent from the following general description and working examples of the preparation of the novel copolymers. Suitable alkyl radicals comprehended by the above formulae include methyl, ethyl, propyl, and isopropyl. In the case of $(CH_2)_m$, the useful radicals are methylene, bimethylene, trimethylene, and tetramethylene.

The addition copolymers described in the previous paragraph can be prepared by copolymerizing in solution in a suitable solvent, at a temperature above the freezing point of the solvent and below its boiling point and preferably from 40 to 70° C., for a period of 1 to 50 hours or more, (1) 1, 2, or more ethylenically unsaturated amides taken from the group consisting of (a) those which have the general formula:

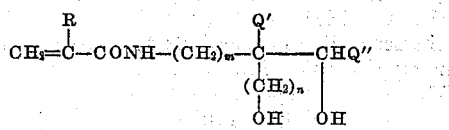

wherein the various radicals have the above significance; and (b) the hydrolyzable acetal derivatives of the dihydroxy compounds of Formula IV which yield the latter compounds on hydrolysis, (2) 1, 2, or more ethylenically unsaturated amides taken from the group consisting of (a) those which have the general formula:

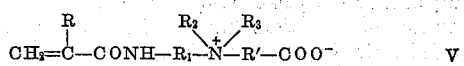

wherein the various radicals have the above significance; and (b) the hydrolyzable ester halides of the betaines of Formula V which yield the latter compounds on hydrolysis, and (3) 1, 2, or more ethylenically unsaturated amides of the general formula:

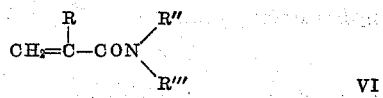

wherein the various radicals have the above significance.

The acetals contemplated in 1(b) above are those which can be purified by distillation. Such acetals are those obtainable from carbonyl compounds of 1 to 7 carbon atoms and are described in Schacklett U. S. application Serial No. 389,872, filed November 2, 1953.

The ester halides contemplated in 2(b) above are those which are obtainable from α-halogenated esters and are described in U. S. application Ser. No. 389,873, filed November 2, 1953 (U. S. Patent 2,777,872, granted Jan. 15, 1957).

The reactants (1), (2), and (3) are copolymerized in the proportions of 5 to 60, 5 to 60 and 30 to 90 mol percent, respectively. The proportions are adjusted within these ranges to obtain the desired properties in particular copolymers designed for specific applications. The polymerization, as stated above, is carried out in a suitable solvent, e. g., water or mixtures of water with a water-miscible solvent, including methanol, ethanol, propanol, isopropyl alcohol, and tertiary butyl alcohol, and may be accelerated by heat, actinic light of wavelengths between 1800 and 7000 A. U. and an addition polymerization initiator, or a combination of these conditions. Suitable initiators include organic and inorganic peroxides, alkali metal and ammonium persulfates, azonitriles and azo-amidine hydrochlorides. The polymerization preferably is carried out between 40° C. and 70° C. since polymers of suitable molecular weight are obtained within this range. At higher temperatures there is a tendency for lower molecular weight polymers to be formed, and at lower temperatures higher molecular weight polymers are formed.

Various concentrations of monomers may be present in the solvent medium and concentrations from ½ to 2 molar are preferred. It has been found that an increase in monomer concentration results in copolymers of higher molecular weight while a decrease in polymer concentration results in copolymers of lower molecular weight.

It will be apparent from the above that by varying the concentration of monomers, the ratio of water and water-soluble solvent, temperature, and amount of polymerization initiator, there may be obtained copolymers of different molecular weights and viscosities. By a suitable choice of conditions, there may be obtained copolymers of any desired molecular weight.

After the copolymerization reaction is complete, the resulting viscous solution is treated with a water-miscible non-solvent for the polymer, e. g., acetone, methyl ethyl ketone, methanol, ethanol, or dioxane, which treatment precipitates the polymer in the form of a white solid which may be broken up, reduced or ground to smaller sizes, washed and dried.

The reactants (1) constitute the subject matter of copending application Ser. No. 389,872, filed November 2, 1953. These compounds (having Formula IV above) can be prepared by reacting an acetal of a dihydroxy aliphatic amine with an acrylic or substituted acrylic acid halide, or anhydride, e. g., acrylyl chloride, methacrylyl chloride, ethacrylyl chloride, α-propylacrylyl chloride, and the corresponding anhydrides. The amidation reaction is preferably carried out in the presence of aqueous alkali, e. g., sodium or potassium hydroxide or other strong organic or inorganic base, to neutralize the acid formed during the reaction, and in the presence of a water-immiscible solvent, e. g., diethyl ether and benzene. The monomeric product is separated from the reaction mixture and purified, for example, by distillation under reduced pressure.

The reactants (2) constitute the subject matter of aforesaid Patent 2,777,872. These compounds (having Formula V) wherein R' is a divalent, saturated, aliphatic hydrocarbon radical having the configuration $$-CHR_5-CHR_6-$$

in which $R_5$ and $R_6$ may be hydrogen, methyl or ethyl, and the other symbols have the values assigned above, can be made as described in said patent by the reaction of (A) a dialkylaminoalkyl-acrylamide or α-hydrocarbon substituted-acrylamide having a hydrogen atom attached to the amide nitrogen atom with (B) a β-lactone, preferably in the presence of an inert liquid diluent which may be a solvent for said reactants, at a temperature from −20 to +40° C. and preferably between 0° C. and +20° C. in the substantial absence of water, including water vapor. The precipitated amide is then recovered under moisture-free conditions. Suitable inert diluents include diethyl ether, acetone, methylethyl ketone, tetrahydrofuran and dioxane.

Another suitable specific class of amide reactants of the type covered by general Formula V, but wherein R' is a divalent, saturated, aliphatic hydrocarbon radical having the configuration —$CHR_4$— where $R_4$ is hydrogen, methyl, ethyl, propyl, or isopropyl, and the other symbols have the values assigned above, can be made, as described in application Serial No. 389,872, by reacting (C) a dialkylaminoalkylacrylamide or α-hydrocarbon substituted-acrylamide having a hydrogen atom attached to the amide nitrogen atom with (D) a lower alkyl ester of an α-halogen-substituted fatty acid, preferably in the presence of an inert liquid diluent of the type described above, at a temperature from −20° C. to +60° C. and preferably +20° C. to +30° C., followed by hydrolysis of the ester group at pH about 10, as described below.

Suitable reactants (3) (having Formula VI) are well known and described in various chemical journals, textbooks and patents, and in the applications referred to above. Further, it is to be understood that any of the reactants ((1), (2) and (3) above) which are comprehended by the general formulae and are described in the applications referred to can be used in making the addition copolymers of this invention, having three or more components.

When the reactants contain hydrolyzable acetal groups or carboxylic ester groups as in reactants (1) and (2) above, these groups can be hydrolyzed prior to, during, or subsequent to, the addition polymerization reaction. In the case of the betaine derivatives (reactant 2(b)), they may be added to the copolymerization reaction zone in the unhydrolyzed form. In such case, it is preferable to hydrolyze the polymeric betaine derivatives, to convert the extralinear ester groups into betaine groups before precipitation of the polymer with a water-miscible non-solvent therefor. This hydrolysis may be accomplished by admixing with the solvent solution of the copolymer a sufficient quantity of a strong base, e. g., sodium hydroxide, potassium hydroxide, barium hydroxide, tetramethylammonium hydroxide, etc., to maintain its pH at about 10.0, and allowing the mixture to stand for a period of one-fourth to one hour, generally about one-half hour at a moderate temperature, preferably about room temperature (25° C.). After the hydrolysis reaction is complete, a suitable acid, e. g., hydrochloric, sulfuric, phosphoric, or acetic, may be added to neutralize the base before precipitation of the copolymer.

In the case of the acetal derivatives (reactant 1(b)), they likewise may be added to the copolymerization zone in unhydrolyzed form. In such case, it is preferable to hydrolyze the copolymers containing such acetal groups, before precipitation of the polymer with a water-miscible non-solvent therefor. This hydrolysis may be accomplished by admixing with the solvent solution of the copolymer a sufficient quantity of a strong organic or inorganic acid, e. g., sulfuric, hydrochloric, trichloroacetic, etc., to maintain its pH at about 2.0, for a period of one-quarter to one hour, at room temperature (25° C.). After the hydrolysis reaction is complete, a suitable alkali, e. g., sodium carbonate, sodium hydroxide, ammonium hydroxide or potassium hydroxide may be added to neutralize the acid before precipitation of the copolymer.

The invention will be further illustrated but is not intended to be limited by the following examples wherein the parts stated are parts by weight, unless otherwise indicated, the polymerization initiator (referred to as initiator) is α,α'-azo-bis(isobutyramidine hydrochloride)

and the relative viscosity is that of a 1% by weight aqueous solution.

EXAMPLE I

*Copolymerization of N,4-methacrylamidomethyl-2,2-dimethyl-1,3-dioxolane, N,2-methacrylamidoethyl - N,N-dimethyl-β-aminopropionate betaine and methacrylamide*

In a glass vessel there was placed 2000 parts of water. The temperature was adjusted to 40° C., by means of a water bath, and nitrogen gas was passed through the water for a period of about ½ hour to remove dissolved oxygen. Then, 120.0 parts of N,4-methacrylamidomethyl-2,2-dimethyl-1,3-dioxolane, 91.2 parts of N,2-methacrylamidoethyl - N,N - dimethyl - β - aminopropionate betaine, 84.0 parts of methacrylamide, and 0.20 part of initiator were added. The introduction of nitrogen was continued and polymerization was allowed to proceed for 20 hours. An additional portion of 0.20 part of initiator was added and polymerization was allowed to continue for 20 hours longer. The copolymer solution was then adjusted to pH 1 to 2 with dilute aqueous hydrochloric acid for a period of about ½ hour and then neutralized to pH 7 with dilute aqueous sodium hydroxide. Excess acetone was added to the copolymer solution, which treatment caused coagulation of the copolymer. The copolymer was then pulverized, and washed with acetone and dried to yield 190 parts of the white, water-soluble powder, namely, poly(N,2,3-dihydroxypropylmethacrylamide co N,2 - methacrylamidoethyl - N,N - dimethyl-β-aminopropionate betaine co methacrylamide). The relative viscosity of a 1% aqueous solution of this material at pH 7 and 30° C., was 3.34. Treatment of solutions of this substance with alkaline borate solutions caused it to set to a rigid gel which was easily de-gelled by making the solution acidic.

EXAMPLE II

*Copolymerization of N,4-methacrylamidomethyl-2,2-dimethyl - 1,3 - dioxolane, N,3 - acrylamidopropyl - N,N-dimethyl-β-aminopropionate betaine and methacrylamide*

In a glass vessel there was placed 500 parts of water. The temperature was adjusted to 60° C., by means of a water bath, and nitrogen gas was passed through the water for a period of about ½ hour to remove dissolved oxygen. Then, 20.0 parts of N,4-methacrylamidomethyl-2,2-dimethyl-1,3-dioxolane, 22.8 parts of N,3-acrylamidopropyl-N,N-dimethyl-β-aminopropionate betaine, 25.5 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7 as set forth in Example I. Excess acetone was added to the copolymer solution, which treatment caused coagulation of the copolymer. This substance was then pulverized, and washed with acetone and dried to yield 58 parts of the white, water-soluble powder, namely, poly-(N,2,3 - dihydroxypropoylmethacrylamide co N,3 - acrylamidopropyl-N,N-dimethyl-β-aminopropionate betaine co methacrylamide). The relative viscosity of a 1% aqueous solution of this material at pH 7 and 30° C., was 1.75.

EXAMPLE III

*Copolymerization of N,4-acrylamidomethyl-2,2-dimethyl-1,3 - dioxolane, N,2 - methacrylamidoethyl-N,N-dimethyl-β-aminopropionate betaine, and methacrylamide*

In a glass vessel there was placed 500 parts of water. The temperature was adjusted to 40° C., by means of a water bath, and nitrogen gas was passed through the water for a period of about ½ hour to remove dissolved oxygen. Then, 27.8 parts of N,4-acrylamidomethyl-2,2-dimethyl-1,3-dioxolane, 22.8 parts of N,2-methacrylamidoethyl-N,N-dimethyl-β-aminopropionate betaine, 21.5 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer. This substance was then pulverized, and washed with acetone and dried to yield 54 parts of the white, water-soluble powder, namely, poly(N,2,3-dihydroxypropylacrylamide co N,2-methacrylamidoethyl - N,N - dimethyl - β - aminopropionate betaine co methacrylamide). The relative viscosity of a 1% aqueous solution of this material at pH 7 and 30° C., was 2.30.

EXAMPLE IV

*Copolymerization of N,4 - methacrylamidomethyl - 2,2-dimethyl - 1,3 - dioxolane, carboethoxymethyl - 2-methacrylamidoethyl dimethylammonium chloride and methacrylamide*

In a glass vessel there was placed 1000 parts of water. The temperature was adjusted to 60° C., by means of a water bath, and nitrogen gas was passed through the water for a period of about ½ hour to remove dissolved oxygen. Then, 60.0 parts of N,4-methacrylamidomethyl-2,2-dimethyl-1,3-dioxolane, 55.7 parts of carboethoxymethyl 2-methacrylamidoethyl dimethylammonium chloride, 42.5 parts of methacrylamide, and 0.10 part of initiator were added. The introduction of nitrogen was continued and polymerization was allowed to proceed for 20 hours. The copolymer solution was then adjusted to pH 10 to 11 with dilute aqueous NaOH for a period of about ½ hour and then to pH 1 to 2 with dilute aqueous hydrochloric acid for an additional ½ hour, and finally neutralized with NaOH to pH 7. Excess acetone was added to the copolymer solution, which treatment caused coagulation of the copolymer. This substance was then pulverized, and washed with acetone and dried to yield 138 parts of the white, water-soluble powder, namely, poly(N,2,3-dihydroxypropylmethacrylamide co N,2-methacrylamidoethyl - N,N - dimethylaminoacetate betaine co methacrylamide). The relative viscosity of a 1% aqueous solution of this material at pH 7 and 30° C., was 1.67.

EXAMPLE V

*Copolymerization of N,2,3 - dihydroxypropylmethacrylamide, N,2 - methacrylamidoethyl - N,N - dimethyl - β-aminopropionate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, 45.6 parts of N,2-methacrylamidoethyl-N,N-dimethyl-β-aminopropionate betaine, a solution of 47.7 parts of N,2,3-dihydroxypropylmethacrylamide (prepared by hydrolysis of 59.8 parts of N,4-methacrylamidomethyl-2,2-dimethyl-1,3-dioxolane in 200 parts of water with dilute aqueous hydrochloric acid at pH 1 to 2 followed by neutralization with dilute aqueous NaOH to pH 7), 42.5 parts of methacrylamide, and 0.10 part of initiator were added. The introduction of nitrogen was continued and polymerization was allowed to proceed for 20 hours. Excess acetone was added to the copolymer solution, which treatment caused coagulation of the copolymer. This substance was then pulverized, and washed with acetone and dried to yield 102 parts of the white, water-soluble powder, namely, poly(N,2,3-dihydroxypropylmethacrylamide co N,2-methacrylamidoethyl-N,N-dimethyl-β-aminopropionate betaine co methacrylamide). The relative viscosity of a 1% aqueous solution of this material at pH 7 and 30° C., was 3.60.

EXAMPLE VI

*Copolymerization of N,4 - methacrylamidomethyl - 2,2-dimethyl - 1,3 - dioxolane, N,2 - methacrylamidoethyl-N,N - dimethylaminoacetate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, 80.0 parts of N,4-methacrylamidomethyl-2,2 - dimethyl - 1, 3 - dioxolane, a solution of 21.4 parts of N,2 - methacrylamidoethyl - N,N - dimethylaminoacetate betaine (prepared by hydrolysis of 26.5 parts of carbomethoxymethyl 2 - methacrylamidoethyl dimethylammonium chloride in 200 parts of water with dilute aqueous NaOH at pH 10 to 11 followed by neutralization with dilute aqueous hydrochloric acid to pH 7), 42.5 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, each as in Example I. Excess acetone was added to the copolymer solution, which treatment caused coagulation of the copolymer. This substance was then pulverized, and washed with acetone and dried to yield 86 parts of the white, water-soluble powder, namely, poly(N,2,3 - dihydroxypropylmethacrylamide co N,2-methacrylamidoethyl - N,N - dimethylaminoacetate betaine co methacrylamide). The relative viscosity of a 1% aqueous solution of this material at pH 7 and 30° C., was 1.86.

EXAMPLE VII

*Copolymerization of N,4 - methacrylamidomethyl - 2,2-dimethyl - 1,3 - dioxolane, N,3 - methacrylamidopropyl-N,N - dimethylaminoacetate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, 40.0 parts of N,4-methacrylamidomethyl-2,2 - dimethyl - 1,3 - dioxolane, a solution of 45.6 parts of N,3 - methacrylamidopropyl - N,N - dimethylaminoacetate betaine (prepared by hydrolysis of 58.5 parts of carboethoxymethyl 3 - methacrylamidopropyl dimethylammonium chloride in 200 parts of water at pH 10 to 11 followed by neutralization to pH 7, as set forth in Example VI), 51.0 parts of methacrylamide, and 0.10 parts of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer. This substance was then pulverized, and washed with acetone and dried to yield 74 parts of the white, water-soluble powder, namely, poly(N,2,3 - dihydroxypropylmethacrylamide co N,2 - methacrylamidoethyl - N,N - dimethylaminoacetate betaine co methacrylamide). The relative viscosity of a 1% aqueous solution of this material at pH 7 and 30° C., was 1.92.

EXAMPLE VIII

*Copolymerization of N,4 - methacrylamidomethyl - 2,2-dimethyl - 1,3 - dioxolane, N,2 - methacrylamidoethyl-N,N - diethylaminoacetate betaine and methacrylamide acrylamide*

In a glass vessel there was placed 800 parts of water. The temperature was adjusted to 60° C., by means of a water bath, and nitrogen gas was passed through the solution for a period of about ½ hour to remove dissolved oxygen. Then, 60.0 parts of N,4-methacrylamidomethyl - 2,2 - dimethyl - 1,3 - dioxolane, a solution of 48.4 parts of N,2 - methacrylamidoethyl - N,N - diethylaminoacetate betaine (prepared by hydrolysis of 70.2 parts of carboethoxymethyl 2 - methacrylamidoethyl diethylammonium bromide in 200 parts of water at pH 10 to 11 followed by neutralization to pH 7), 34.0 parts of methacrylamide, 7.1 parts of acrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer. This substance was then pulverized, and washed with acetone and dried to yield 107 parts of the white, water-soluble powder, namely, poly(N,2,3 - dihydroxypropylmethacrylamide co N,2 - methacrylamidoethyl - N,N - diethylaminoacetate betaine co methacrylamide co acrylamide). The relative viscosity of a 1% aqueous solution of this material at pH 7 and 30° C., was 2.20.

EXAMPLE IX

*Copolymerization of N,4 - methacrylamidomethyl - 2,2-dimethyl - 1,3 - dioxolane, N,3 - methacrylamidopropyl-N,N - diethylaminoacetate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, 60.0 parts of N,4-methacrylamidomethyl-2,2 - dimethyl - 1,3 - dioxolane, a solution of 51.2 parts of N,3 - methacrylamidopropyl - N,N - diethylaminoacetate betaine (prepared by hydrolysis of 75.8 parts of carboethoxymethyl 3 - methacrylamidopropyl diethylammonium bromide in 200 parts of water at pH 10 to 11 followed by neutralization to pH 7), 42.5 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer. This substance was then pulverized, and washed with acetone and dried to yield 113 parts of the white, water-soluble powder, namely, poly(N,2,3-dihydroxypropylmethacrylamide co N,3 - methacrylamidopropyl - N,N - diethylaminoacetate betaine co methacrylamide). The relative viscosity of a 1% aqueous solution of this material at pH 7 and 30° C., was 1.92.

EXAMPLE X

*Copolymerization of N,4-methacrylamidomethyl-2,2-dimethyl-1,3-dioxolane, N,2-methacrylamidoethyl-N,N-dimethyl-α-aminopropionate betaine, methacrylamide and acrylamide*

In a glass vessel there was placed 800 parts of water. The temperature was adjusted to 60° C., by means of a water bath, and nitrogen gas was passed through the water for a period of about ½ hour to remove dissolved oxygen. Then, 60.0 parts of N,4-methacrylamidomethyl-2,2-dimethyl-1,3-dioxolane, a solution of 22.8 parts of N,2- methacrylamidoethyl-N,N- dimethyl-α- aminopropionate betaine (prepared by hydrolysis of 37.0 parts of 1-carbomethoxyethyl 2-methacrylamidoethyl dimethylammonium iodide in 200 parts of water at pH 10 to 11 followed by neutralization to pH 7, as set forth in Example VI), 34.0 parts of methacrylamide, 14.2 parts of acrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, set forth in Example I. Excess acetone was added to the copolymer solution, which treatment caused coagulation of the copolymer. This substance was then pulverized, and washed with acetone and dried to yield 72 parts of the white, water-soluble powder, namely, poly-(N,2,3-dihydroxypropylmethacrylamide co N,2-methacrylamidoethyl-N,N-dimethyl-α-aminopropionate betaine co methacrylamide co acrylamide). The relative viscosity of a 1% aqueous solution of this material at pH 7 and 30° C., was 1.82.

EXAMPLE XI

*Copolymerization of N,4-methacrylamidomethyl-2,2-dimethyl-1,3-dioxolane, N,3-methacrylamidopropyl-N,N-dimethyl-α-aminopropionate betaine, methacrylamide and N,N-dimethyl-acrylamide*

In a glass vessel there was placed 800 parts of water. The temperature was adjusted to 60° C., by means of a water bath, and nitrogen gas was passed through the water for a period of about ½ hour to remove dissolved oxygen. Then, 60 parts of N,4-methacrylamidomethyl-2,2-dimethyl-1,3-dioxolane, a solution of 24.2 parts of N,3-methacrylamidopropyl-N,N-dimethyl-α-aminopropionate betaine (prepared by hydrolysis of 35.1 parts of 1-carboethoxyethyl-3-methacrylamidopropyl dimethylammonium bromide in 200 parts of water, at pH 10 to 11 followed by neutralization to pH 7, as set forth in Example VI), 34.0 parts of methacrylamide, 9.9 parts of N,N-dimethylacrylamide, and 0.10 part of initiator were added. The introduction of nitrogen was continued and polymerization was allowed to proceed for 20 hours. The copolymer solution was then adjusted to pH 7. Excess acetone was added to the copolymer solution, which treatment caused coagulation of the copolymer. This substance was then pulverized, and washed with acetone and dried to yield 79 parts of the white, water-soluble powder, namely, poly(N,2,3-dihydroxypropylmethacrylamide co N,3-methacrylamidopropyl-N,N-dimethyl-α-aminopropionate betaine co methacrylamide co N,N-dimethylacrylamide). The relative viscosity of a 1% aqueous solution of this material at pH 7 and 30° C., was 2.03.

EXAMPLE XII

*Copolymerization of N,4-methacrylamidomethyl-2,2-dimethyl-1,3-dioxolane, N,2-acrylamidoethyl-N,N-dimethylaminoacetate betaine and methacrylamide*

In a glass vessel there was placed 800 parts of water. The temperature was adjusted to 60° C., by means of a water bath, and nitrogen gas was passed through the water for a period of about ½ hour to remove dissolved oxygen. Then, 60 parts of N,4-methacrylamidomethyl-2,2-dimethyl-1,3-dioxolane, a solution of 40.0 parts of N,2-acrylamidoethyl-N,N-dimethylaminoacetate betaine (prepared by hydrolysis of 59.0 parts of carbomethoxymethyl-2-methacrylamidoethyl dimethylammonium bromide in 200 parts of water at pH 10 to 11 followed by neutralization to pH 7, each as in Example VI), 42.5 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer. This substance was then pulverized, and washed with acetone and dried to yield 65 parts of the white, water-soluble powder, namely, poly(N,2,3-dihydroxypyropylmethacrylamide co N,2-acrylamidoethyl-N,N-dimethylaminoacetate betaine co methacrylamide). The relative viscosity of a 1% aqueous solution of this material at pH 7 and 30° C., was 2.09.

The above procedure was repeated with the following changes:

51.0 parts of methacrylamide, and a solution of 20.0 parts of N,2-acrylamidoethyl-N,N-dimethylaminoacetate betaine (prepared from 29.5 parts of carbomethoxymethyl-2-acrylamidoethyl dimethylammonium bromide) gave 67 parts of the copolymer, the relative viscosity of whose 1% aqueous solution at pH 7 and 30° C., was 1.97.

A second repeat of the above procedure was made in which the only change was that the solution of 40 parts of N,2-acrylamidoethyl-N,N-dimethylaminoacetate betaine was prepared from 61.8 parts of carboethoxymethyl 2-acrylamidoethyl dimethylammonium bromide. The yield of the copolymer in this case was 81 parts and its relative viscosity was 1.91.

EXAMPLE XIII

*Copolymerization of N,4-methacrylamidomethyl-2,2-dimethyl-1,3-dioxolane, N,2-acrylamidoethyl-N,N-dimethyl-α-aminopropionate betaine and methacrylamide*

In a glass vessel there was placed 800 parts of water. The temperature was adjusted to 60° C., by means of a water bath, and nitrogen gas was passed through the water for a period of about ½ hour. Then, 60.0 parts of N,4-methacrylamidomethyl-2,2-dimethyl-1,3-dioxolane, a solution of 21.4 parts of N,2-acrylamidoethyl-N,N-dimethyl-α-aminopropionate betaine (prepared by hydrolysis of 35.6 parts of 1-carbomethoxyethyl-2-acrylamidoethyl dimethylammonium iodide in 200 parts of water at pH 10 to 11 followed by neutralization to pH 7, as set forth in Example VI), 51.0 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution to coagulate the copolymer, which was puverized, washed with acetone and dried to yield 83 parts of the white, water-soluble powder, namely, poly(N,2,3-dihydroxypropylmethacrylamide co N,2-acrylamidoethyl-N,N-dimethyl-α-aminopropionate betaine co methacrylamide). The relative viscosity of a 1% aqueous solution of this copolymer at pH 7 and 30° C., was 1.87.

EXAMPLE XIV

*Copolymerization of N,4-methacrylamidomethyl-2,2dimethyl-1,3-dioxolane, N,3-acrylamidopropyl-N,N-dimethyl-α-aminopropionate betaine and methacrylamide*

In a glass vessel there was placed 800 parts of water. The temperature was adjusted to 60° C., by means of a water bath, and nitrogen gas was passed through the water for a period of about ½ hour. Then, 60.0 parts of N,4-methacrylamidomethyl-2,2-dimethyl-1,3-dioxolane, a solution of 22.8 parts of N,3-acrylamidopropyl-N,N-dimethyl-α-aminopropionate betaine (prepared by hydrolysis of 37.0 parts of 1-carbomethoxyethyl 3-acrylamidopropyl dimethylammonium iodide in 200 parts of water at pH 10 to 11 followed by neutralization to pH 7, as set forth in Example VI), 51.0 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution to coagulate the copolymer, which was pulverized, washed with acetone and dried to yield 56 parts of the white, water-soluble powder, namely, poly(N,2,3-dihydroxypropylmethacrylamide co N,3-acrylamidopropyl-N,N-dimethyl-α-aminopropionate betaine co methacrylamide). The relative viscosity of a 1% aqueous solution of this copolymer at pH 7 and 30° C., was 1.88.

EXAMPLE XV

*Copolymerization of N,3-methacrylamidopropyl-N,N-dimethyl-β-aminopropionate betaine, N,2,3-dihydroxypropylacrylamide and methacrylamide*

In a glass vessel there was placed 400 parts of water. The temperature was adjusted to 60° C., by means of a water bath, and nitrogen gas was passed through the water for a period of about ½ hour. Then, 24.2 parts of N,3-methacrylamidopropyl-N,N-dimethyl-β-aminopropionate betaine, a solution of 21.8 parts of N,2,3-dihydroxypropylacrylamide (prepared by hydrolysis of 27.8 parts of N,4-acrylamidomethyl-2,2-dimethyl-1,3-dioxolane in 100 parts of water at pH 1 to 2 followed by neutralization to pH 7, as set forth in Example V), 21.3 parts of methacrylamide, and 0.10 part of initiator were added. The introduction of nitrogen was continued and polymerization was allowed to proceed for 20 hours. Excess acetone was added to the copolymer solution to coagulate the copolymer which was pulverized, washed with acetone and dried to yield 68 parts of the white, water-soluble powder, namely, poly(N,2,3-dihydroxypropylacrylamide co N,3-methacrylamidopropyl-N,N-dimethyl-β-aminopropionate betaine co methacrylamide). The relative viscosity of a 1% aqueous solution of this copolymer at pH 7 and 30° C., was 1.73.

EXAMPLE XVI

*Copolymerization of N,4-acrylamidomethyl-2,2-dimethyl-1,3 - dioxolane, N,2 - acrylamidoethyl - N,N - dimethyl-β-aminopropionate betaine and methacrylamide*

In a glass vessel there was placed 500 parts of water. The temperature was adjusted to 60° C., by means of a water bath, and nitrogen gas was passed through the water for a period of about ½ hour. Then, 27.8 parts of N,4-acrylamidomethyl-2,2-dimethyl-1,3-dioxolane, 21.4 parts of N,2-acrylamidoethyl-N,N-dimethyl-β-aminopropionate betaine, 21.3 parts of methacrylamide, and 0.10 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution, which treatment caused coagulation of the copolymer which was pulverized, washed with acetone and dried to yield 69 parts of the white, water-soluble powder, namely, poly-(N,2,3-dihydroxypropylacrylamide co N,2-acrylamidoethyl-N,N-dimethyl-β-aminopropionate betaine co methacrylamide). The relative viscosity of a 1% aqueous solution of this copolymer at pH 7 and 30° C.. was 1.55.

EXAMPLE XVII

*Copolymerization of N,2,3-dihydroxyproplymethacrylamide, carboethoxymethyl-2-acrylamidoethyl diethylammonium bromide, and methacrylamide*

In a glass vessel there was placed 400 parts of water. The temperature was adjusted to 60° C., by means of a water bath, and nitrogen gas was passed through the water for a period of about ½ hour. Then, 16.85 parts of carboethoxymethyl-2-acrylamidoethyl diethylammonium bromide, a solution of 23.9 parts of N,2,3-dihydroxypropylmethacrylamide (prepared by hydrolysis of 29.9 parts of N,4-methacrylamidomethyl-2,2-dimethyl-1,3-dioxolane in 100 parts of water at pH 1 to 2 followed by neutralization to pH 7, as set forth in Example V), 25.5 parts of methacrylamide, and 0.10 part of initiator were added. The introduction of nitrogen was continued and polymerization was allowed to proceed for 20 hours. The copolymer solution was then adjusted to pH 10 to 11 for a period of about ½ hour and then neutralized to pH 7, as set forth in Example VI. Excess acetone was added to the copolymer solution to coagulate the copolymer which was pulverized, washed with acetone and dried to yield 58 parts of the white, water-soluble powder, namely, poly(N,2,3-dihydroxyproplymethacrylamide co N,2-acrylamidoethyl-N,N-diethylaminoacetate betaine co methacrylamide). The relative viscosity of a 1% aqueous solution of this copolymer at pH 7 and 30° C., was 1.56.

EXAMPLE XVIII

*Copolymerization of N,2,3-dihydroxypropylmethacrylamide, carboethoxymethyl-3-acrylamidopropyl diethylammonium iodide, methacrylamide and N-isopropylmethacrylamide*

In a glass vessel there was placed 400 parts of water. The temperature was adjusted to 60° C., by means of a water-bath, and nitrogen gas was passed through the water for a period of about ½ hour. Then, 39.8 parts of carboethoxymethyl-3-acrylamidopropyl diethylammonium iodide, a solution of 23.9 parts of N,2,3-dihydroxypropylmethacrylamide (prepared by hydrolysis of 29.9 parts of N,4-methacrylamidomethyl-2,2-dimethyl-1,3-dioxolane in 100 parts of water at pH 1 to 2 followed by hydrolysis to pH 7, as set forth in Example V), 17.0 parts of methacrylamide, and 0.10 part of initiator were added. The introduction of nitrogen was continued and polymerization was allowed to proceed for 20 hours. The copolymer solution was then adjusted to pH 10 to 11 for a period of about ½ hour and then neutralized to pH 7, as set forth in Example VI. Excess acetone was added to the copolymer solution to coagulate the copolymer which was pulverized, washed with acetone and dried to yield 67 parts of the white, water-soluble powder, namely, poly(N,2,3-dihydroxypropylmethacrylamide co N,3-acrylamidopropyl-N,N-diethylaminoacetate betaine co methacrylamide co N-iso-propylmethacrylamide). The relative viscosity of a 1% aqueous solution of this copolymer at pH 7 and 30° C., was 1.69.

EXAMPLE XIX

*Copolymerization of 2,2,5-trimethyl-N-5-methacrylamido-1,3-dioxane, N,3-methacrylamidopropyl-N,N-dimethyl-β-aminopropionate betaine and methacrylamide*

In a glass vessel there was placed 100 parts of water. The temperature was adjusted to 60° C., by means of a water bath, and nitrogen gas was passed through the water for a period of about ½ hour. Then, 6.4 parts of 2,2,5-trimethyl-N,5-methacrylamido - 1,3 - dioxane, 4.84 parts of N,3-methacrylamidopropyl-N-dimethyl-β-aminopropionate betaine, 4.25 parts of methacrylamide, and 0.01 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution to coagulate the copolymer, which was pulverized, washed with acetone and dried to yield 14 parts of the white, water-soluble powder, namely, poly(N,2-methyl-1,3-dihydroxyisopropylmethacrylamide co N,3-methacrylamidopropyl-N,N-dimethyl-β-aminopropionate betaine co methacrylamide). The relative viscosity of a 1% aqueous solution of this copolymer at pH 7 and 30° C., was 1.44.

EXAMPLE XX

*Copolymerization of 2,2,5-trimethyl-N,5-acrylamido-1,3-dioxane, N,2-acrylamidoethyl-N,N-dimethyl-β-aminopropionate betaine and methacrylamide*

In a glass vessel there was placed 100 parts of water. The temperature was adjusted to 60° C., by means of water bath, and nitrogen gas was passed through the water for a period of about ½ hour. Then, 6.0 parts of 2,2,5-trimethyl-N,5-acrylamido-1,3-dioxane, 2.14 parts of N,2-acrylamidoethyl-N,N-dimethyl-β-aminopropionate betaine, 5.10 parts of methacrylamide, and 0.01 part of initiator were added. The introduction of nitrogen was continued and polymerization was allowed to proceed for 20 hours. The copolymer solution was then adjusted to pH 1 to 2 for a period of about ½ hour and then neutralized to pH 7, as set forth in Example I. Excess acetone was added to the copolymer solution to coagulate the copolymer which was pulverized, washed with acetone and dried to yield 10 parts of the white, water-soluble powder, namely, poly(N,2-methyl - 1,3-dihydroxyisoproplyacrylamide co N,2-acrylamidoethyl-N,N-dimethyl-β-aminopropionate betaine co methacrylamide). The relative viscosity of a 1% aqueous solution of this copolymer at pH 7 and 30° C., was 1.43.

EXAMPLE XXI

*Copolymerization of N,2-methyl-1,3-dihydroxyisopropylmethacrylamide, N,2 - methacrylamidoethyl - N,N - dimethyl-β-aminopropionate betaine and methacrylamide*

In a glass vessel there was placed 80 parts of water. The temperature was adjusted to 60° C., by means of a water bath, and nitrogen gas was passed through the water for a period of about ½ hour. Then, 4.56 parts of N,2 - methacrylamidoethyl-N,N-dimethyl-β-aminopropionate betaine, a solution of 5.2 parts of N,2-methyl-1,3-dihydroxyisopropylmethacrylamide (prepared by hydrolysis of 6.4 parts of 2,2,5-trimethyl-N,5-methacrylamido-1,3-dioxane in 20 parts of water at pH 1 to 2 followed by neutralization to pH 7, as set forth in Example V), 4.25 parts of methacrylamide, and 0.01 part of initiator were added. The introduction of nitrogen was continued and polymerization was allowed to proceed for 20 hours. Excess acetone was added to the copolymer solution to coagulate the copolymer which was pulverized, washed with acetone and dried to yield 12 parts of the white, water-soluble powder, namely, poly(N,2-methyl-1,3-dihydroxyisopropylmethacrylamide co N,2-methacrylamidoethyl-N,N-dimethyl-β-aminopropionate betaine co methacrylamide). The relative viscosity of a 1% aqueous solution of this copolymer at pH 7 and 30° C., was 1.71.

EXAMPLE XXII

*Copolymerization of N,2-methyl-1,3-dihydroxyisopropylacrylamide, N,3 - acrylamidopropyl - N,N-dimethyl-β-aminopropionate betaine and methacrylamide*

In a glass vessel there was placed 80 parts of water. The temperature was adjusted to 60° C., by means of a water bath, and nitrogen gas was passed through the water for a period of about ½ hour. Then, 2.28 parts of N,3 - acrylamidopropyl - N,N - dimethyl-β-aminopropionate betaine, a solution of 4.8 parts of N,2-methyl-1,3-dihydroxyisopropylacrylamide (prepared by hydrolysis of 6.0 parts of 2,2,5-trimethyl-N,5-acrylamido-1,3-dioxane in 20 parts of water at pH 1 to 2 followed by neutralization to pH 7, as set forth in Example V), 5.10 parts of methacrylamide, and 0.01 part of initiator were added. The introduction of nitrogen was continued and polymerization was allowed to proceed for 20 hours. Excess acetone was added to the copolymer solution to coagulate the copolymer which was pulverized, washed with acetone and dried to yield 12 parts of the white, water-soluble powder, namely, poly(N,2-methyl-1,3-dihydroxyisopropylacrylamide co N,3-acrylamidopropyl-N,N-dimethyl-β-aminopropionate betaine co methacrylamide). The relative viscosity of a 1% aqueous solution of this copolymer at pH 7 and 30° C., was 1.49.

In place of the methacrylamide used in the foregoing examples, there may be substituted other amides of general Formula VI. Among such suitable amides are acrylamide, ethacrylamide, propacrylamide, cyclohexacrylamide, N - methylmethacrylamide, N,N-dimethylacrylamide, N-isopropylmethacrylamide, N-phenylmethacrylamide, N-methyl-N-ethylacrylamide, etc.

In place of the polymerization initiator used in the foregoing examples, one may substitute one or more other initiators. Among the suitable ones are: benzoyl peroxide, tert. butyl peroxide, tert. butyl hydroperoxide, acetyl peroxide, cumene hydroperoxide, hydrogen peroxide, sodium peroxide, sodium perborate, and sodium persulfate; ammonium persulfate-sodium bisulfite, hydrogen peroxide-thiourea; and potassium persulfate-ferrous sulfate; and α,α'-azobis(isobutyronitrile), α,α'-azobis(α,γ-dimethylvaleronitrile), α,α'-azobis(α,γ,γ-trimethylvaleronitrile), and α,α'-azobis(α-methylbutyronitrile).

The copolymers produced by this invention are quite soluble in water and water-alcohol solutions. When admixed with alkaline solutions containing borate ions the copolymers form cross-linked gels. In acidic borate ion-containing solutions the copolymers do not gel but remain in water or water-alcohol solution. By treating the borate-gels with an acidic solution the cross-linkages are broken and the soluble original copolymers reformed by a de-gelling action. This gelling and de-gelling action may be repeated many times with no degradation of the polymer chain.

The gelling and de-gelling action, it is believed, is produced by virtue of the formation of complex compounds between borate ion and polyhydroxy compounds in which boron has a coordination number of 4. It is believed that the bridges, or cross-links, which are formed between borate ion and the new polymers in alkaline solutions may be represented as follows:

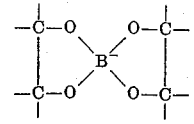

with an α-glycol-containing polymer or

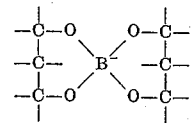

with a β-glycol-containing polymer.

The destruction of these crosslinks in acidic solutions results, it is believed, because the borate is converted into a substituted boric acid in which boron has a coordination number of 3, and which may be represented as follows:

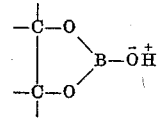

or

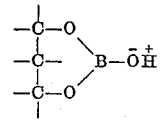

The copolymers of this invention can be used for the preparation of water-permeable colloid layers of photographic films, plates and papers, including not only silver halide layers, but light-insensitive layers such as filter-layers, antihalation layers, anti-static coatings and protective or antiabrasion layers with the addition of dyes, pigments, anti-static agents, etc., where required. By incorporating in a sublayer a water-soluble boron compound capable of yielding borate ions in solution, and coating onto such sublayer, an aqueous solution (having a pH more than 8) of the copolymers of this invention, the coated layer quickly gels due to contact with the water-soluble boron compound. The latter compound apparently migrates into the coated layer. The aqueous solution of copolymer, when containing light-sensitive silver halides and coated in like manner, quickly forms a gelled silver halide emulsion layer.

Suitable gelling agents for the sublayers include boric acid, sodium and potassium tetraborate, metaborate, and orthoborate, glyceryl borate; the sorbitol, mannitol, and dulcitol monoborate and diborates and mono- and polycondensation products and their sodium and ammonium salts set forth in Examples 1 to 19 of United States Patent 2,223,349 and in Examples 3, 4, 5, 7, 9, 14, and 18 to 35 of United States Patent 2,223,948.

An advantage of this invention is that it provides a new class of water-permeable colloids which are useful as superior replacements for gelatin. Another advantage is that it provides new colloids which combine the advantageous properties of gelatin and polyvinyl alcohol, without the need for the temperature-controlled setting of the former. The copolymers, moreover, are uniform in character and thus have advantages over gelatin. A major advantage resides in the fact that the copolymers can be gelled, de-gelled and re-gelled in a reversible and easily controllable fashion.

Another important advantage of the new copolymers provided by the invention resides in the fact that the copolymers are soluble in water or water-alcohol mixtures, but are good colloid binding agents, and after the coated layers are set or gelled by means of borate gelling agents, they are strong, coherent and adherent to gelatin and other sublayers, such as those prepared by means of dispersions of poly(vinylidene chloride co acrylic acid esters co itaconic acid), or by means of mixed acetals of polyvinyl alcohol prepared from aldehydes containing acid groups (e. g., sodium o-sulfobenzaldehyde), together with other aldehydes, e. g., benzaldehyde, as described in Woodward U. S. Patent 2,462,151, and yet are freely permeable to developing, fixing, bleaching, and washing solutions. Moreover, the gelled layers are free from disadvantages of gelatin and gelatin-silver halide layers (i. e., non-uniformity and being subject to the deleterious action of molds and bacteria). Still other advantages will be apparent to those skilled in the art.

The embodiments of the invention in which an exclusive property or privilege is claimed are defined as follows:

1. An addition copolymer containing a substantial number of recurring intralinear units of the formulae:

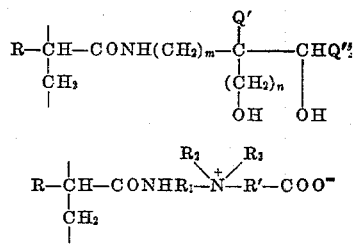

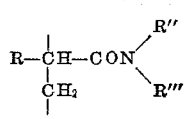

and $$R-\underset{\underset{CH_3}{|}}{CH}-CON\underset{R'''}{\overset{R''}{\diagdown}}$$

wherein R, R'' and R''' are members taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, R' is a saturated bivalent aliphatic hydrocarbon radical containing 1 to 4 carbon atoms, Q' and Q'' are members taken from the group consisting of hydrogen and alkyl radicals of 1 through 3 carbon atoms, $m$ is a number taken from the group consisting of 0, 1, 2, 3, and 4, and $n$ is a number taken from the group consisting of 0 and 1 and the sum of $m$ and $n$ is at least 1, wherein said first unit comprises 5 to 60 mole percent, the second 5 to 60 mole percent and the third 30 to 90 mole percent of the copolymer.

2. An addition copolymer containing a substantial number of recurring units of one each of the following types represented by the formulae:

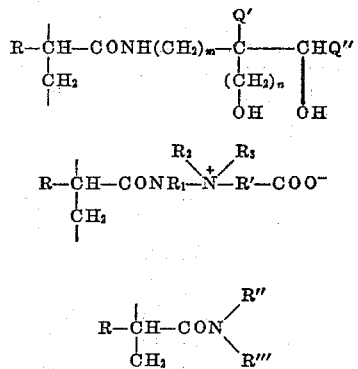

wherein R, R'' and R''' are members taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, R' is a saturated bivalent aliphatic hydrocarbon radical containing 1 to 4 carbon atoms, Q' and Q'' are members taken from the group consisting of hydrogen and alkyl radicals of 1 through 3 carbon atoms, $m$ is a number taken from the group consisting of 0, 1, 2, 3, and 4, and $n$ is a number taken from the group consisting of 0 and 1 and the sum of $m$ and $n$ is at least 1, wherein said first unit comprises 5 to 60 mole percent, the second 5 to 60 mole percent and the third 30 to 90 mole percent of the copolymer.

3. A copolymer as set forth in claim 2 wherein the third unit is methacrylamide.

4. A poly(N,2,3-dihydroxypropylmethacrylamide co N,2-methacrylamidoethyl-N,N - dimethyl - β - aminopropionate betaine co methacrylamide) wherein said first component comprises 5 to 60 mole percent, the second component 5 to 60 mole percent, and the third 30 to 90 mole percent of the copolymer.

5. A poly(N,2,3-dihydroxypropylmethacrylamide co N,3-methacrylamidopropyl-N,N-dimethyl - β - aminopropionate betaine co methacrylamide) wherein said first component comprises 5 to 60 mole percent, the second component 5 to 60 mole percent, and the third 30 to 90 mole percent of the copolymer.

6. A poly(N,2,3-dihydroxypropylacrylamide co N,3-acrylamidopropyl - N,N - dimethyl - β - aminopropionate betaine co methacrylamide) wherein said first component comprises 5 to 60 mole percent, the second component 5 to 60 mole percent, and the third 30 to 90 mole percent of the copolymer.

7. A poly(N,2,3-dihydroxypropylacrylamide co N,2-acrylamidoethyl - N,N - dimethyl - β - aminopropionate betaine co methacrylamide) wherein said first component comprises 5 to 60 mole percent, the second component 5 to 60 mole percent, and the third 30 to 60 mole percent of the copolymer.

8. A poly(N,2,3 - dihydroxypropylacrylamide co N,3-methacrylamidopropyl - N,N - dimethyl - β - aminopropionate betaine co methacrylamide) wherein said first component comprises 5 to 60 mole percent, the second component 5 to 60 mole percent, and the third 30 to 90 mole percent of the copolymer.

9. The process which comprises copolymerizing in solution at a temperature above the freezing point and below the boiling point of the solvent, a mixture from 5 to 60 mole percent of (1) an ethylenically unsaturated amide taken from the group consisting of (a) those of the general formula:

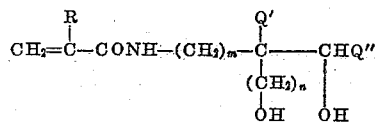

wherein R is a member taken from the group consisting of hydrogen, alkyl of 1 to 3 carbon atoms, phenyl and cyclohexyl, Q' and Q'' are members taken from the group consisting of hydrogen and alkyl radicals of 1 through 3 carbon atoms, $m$ is a member taken from the group consisting of 0, 1, 2, 3, and 4, and $n$ is a number taken from the group consisting of 0 and 1 and the sum of $m$ and $n$ is at least 1, and (b) their acetals of low molecular weight from ketaldones of 1 to 7 carbon atoms from 5 to 60 mole percent of, (2) an ethylenically unsaturated amide taken from the group consisting of (a) those of the general formula:

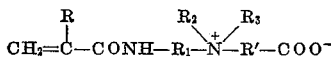

and (b) the hydrolyzable ester halides thereof which yield said compounds upon hydrolysis, and from 30 to 90 mole percent of (3) a compound of the general formula:

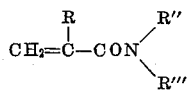

wherein R, R'' and R''' are members taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, R' is a saturated bivalent aliphatic hydrocarbon radical containing 1 to 4 carbon atoms.

10. The process which comprises copolymerizing, in a liquid medium at a temperature between 40° C. and 70° C. a mixture of substantial quantities of compounds of the formulae:

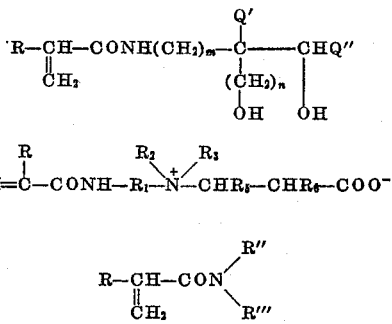

and wherein R, R'' and R''' are members taken from the group consisting of hydrogen, alkyl of 1 to 3 carbon atoms, phenyl and cyclohexyl, $R_1$ is a saturated bivalent aliphatic hydrocarbon radical of 2 to 6 carbon atoms, $R_2$ and $R_3$ are alkyl radicals of 1 to 3 carbon atoms, $R_5$ and $R_6$ are members taken from the group consisting of hydrogen, methyl and ethyl, Q' and Q'' are members taken from the group consisting of hydrogen and alkyl radicals of 1 through 3 carbon atoms, $m$ is a number taken from the group consisting of 0, 1, 2, 3, and 4, and $n$ is a number taken from the group consisting of 0 and 1 and the sum of $m$ and $n$ is at least 1; said first compound being present in an amount of 5 to 60 mole percent, the second in an amount of 5 to 60 mole percent and the third in an amount of 30 to 60 mole percent.

References Cited in the file of this patent

Report on Nomenclature, Journal Polymer Science, vol. 8, No. 3, pp. 257 and 277.

Chemical Abstracts, vol. 39, No. 24, pp. 5918–5919.